US008824358B2

(12) United States Patent
Kim et al.

(10) Patent No.: US 8,824,358 B2
(45) Date of Patent: Sep. 2, 2014

(54) METHOD AND APPARATUS FOR TRANSMITTING AND RECEIVING SIGNALS BETWEEN A BASE STATION AND A RELAY NODE IN A WIRELESS COMMUNICATION SYSTEM

(75) Inventors: Hak Seong Kim, Anyang-si (KR); Han Byul Seo, Anyang-si (KR); Byoung Hoon Kim, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 151 days.

(21) Appl. No.: 13/695,236

(22) PCT Filed: Apr. 27, 2011

(86) PCT No.: PCT/KR2011/003089
§ 371 (c)(1),
(2), (4) Date: Oct. 29, 2012

(87) PCT Pub. No.: WO2011/136562
PCT Pub. Date: Nov. 3, 2011

(65) Prior Publication Data
US 2013/0044676 A1 Feb. 21, 2013

Related U.S. Application Data

(60) Provisional application No. 61/329,116, filed on Apr. 29, 2010.

(51) Int. Cl.
H04B 7/14 (2006.01)
H04W 4/00 (2009.01)
(52) U.S. Cl.
USPC .......................... 370/315; 370/328; 370/329

(58) Field of Classification Search
USPC .................. 370/315, 328, 329, 334, 337, 347
See application file for complete search history.

(56) References Cited

U.S. PATENT DOCUMENTS

| | | | |
|---|---|---|---|
| 2009/0034558 A1* | 2/2009 | Mudulodu et al. | 370/512 |
| 2010/0034135 A1 | 2/2010 | Kim et al. | |
| 2010/0080139 A1 | 4/2010 | Palanki et al. | |
| 2010/0232285 A1* | 9/2010 | Lee et al. | 370/210 |
| 2011/0080896 A1* | 4/2011 | Krishnamurthy et al. | 370/336 |
| 2011/0176502 A1* | 7/2011 | Chung et al. | 370/329 |
| 2012/0002591 A1* | 1/2012 | Noh et al. | 370/315 |

(Continued)

OTHER PUBLICATIONS

In the PCT International Search Report Application Serial No. PCT/KR20111003089 dated Dec. 27, 2011, 11 pages.

*Primary Examiner* — Andrew Lee
(74) *Attorney, Agent, or Firm* — Lee, Hong, Degerman, Kang & Waimey

(57) ABSTRACT

The present invention relates to a method for transmitting signals by a base station in a wireless communication system, the method comprising: resetting a start symbol index for a relay node dedicated downlink physical control channel and a relay node dedicated downlink physical common channel, respectively; transmitting a message including a parameter required for resetting the start symbol index to the relay node; setting the start symbol index to a preset value or a value that has been given prior to receiving the reestablishment message, in the case where the relay node has sent a specific number of NACKs for the relay node dedicated downlink physical control channel or the relay node dedicated downlink physical common channel; and transmitting the relay node dedicated downlink physical control channel and the relay node dedicated downlink physical common channel to the relay node, based on the start symbol index having been set.

12 Claims, 11 Drawing Sheets

(56) References Cited

U.S. PATENT DOCUMENTS

| | | |
|---|---|---|
| 2012/0093064 A1* | 4/2012 | Horiuchi et al. .............. 370/315 |
| 2012/0218964 A1* | 8/2012 | Park et al. ..................... 370/329 |
| 2012/0224472 A1* | 9/2012 | Kim et al. ..................... 370/226 |
| 2013/0016687 A1* | 1/2013 | Yang et al. .................... 370/329 |
| 2013/0258975 A1* | 10/2013 | Krishnamurthy et al. .... 370/329 |
| 2013/0265934 A1* | 10/2013 | Zeng et al. .................... 370/315 |
| 2014/0050126 A1* | 2/2014 | Naden et al. .................. 370/280 |

* cited by examiner

FIG. 2
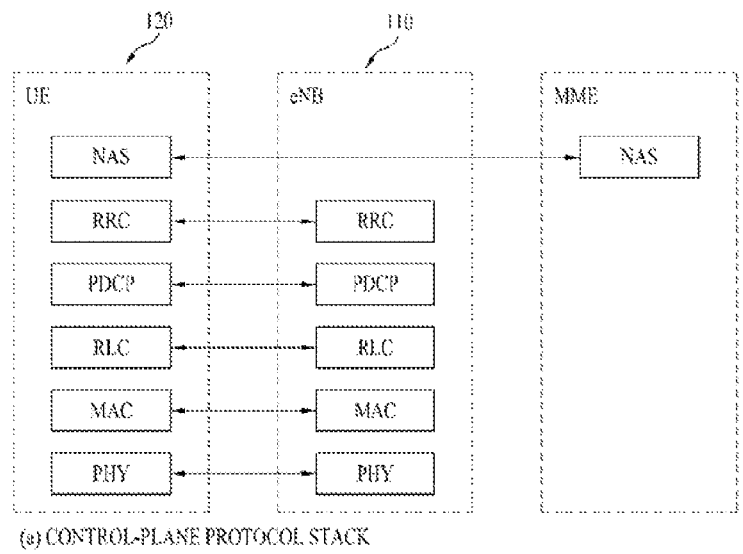
(a) CONTROL-PLANE PROTOCOL STACK
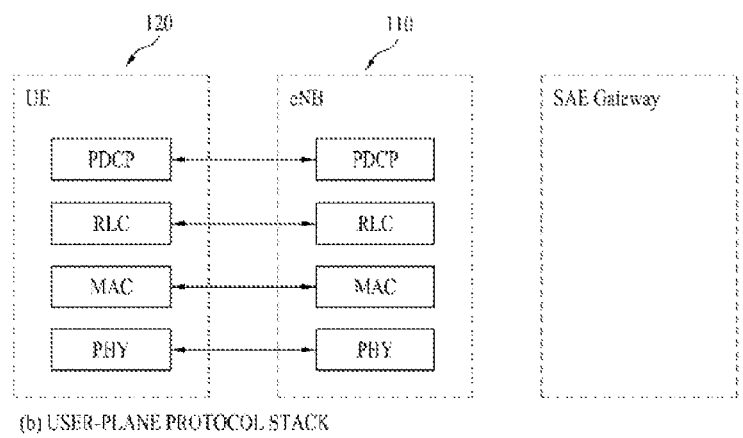
(b) USER-PLANE PROTOCOL STACK //  METHOD AND APPARATUS FOR TRANSMITTING AND RECEIVING SIGNALS BETWEEN A BASE STATION AND A RELAY NODE IN A WIRELESS COMMUNICATION SYSTEM

CROSS-REFERENCE TO RELATED APPLICATIONS

This application is the National Stage filing under 35 U.S.C. 371 of International Application No. PCT/KR2011/003089, filed on Apr. 27, 2011, which claims benefit of U.S. Provisional Application Ser. No. 61/329,116, filed on Apr. 29, 2010, the contents of which are all hereby incorporated by reference herein in their entirety.

TECHNICAL FIELD

The present invention relates to a wireless communication system, more specifically, a method and an apparatus for transmitting and receiving signals between a base station and a relay node in a wireless communication system.

BACKGROUND ART

A $3^{rd}$ generation partnership project long term evolution (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS system is an evolved version of the conventional UMTS system, and its basic standardization is in progress under the 3rd Generation Partnership Project (3GPP). The E-UMTS may also be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE) 120, base stations (eNode B and eNB) 110a and 110b, and an Access Gateway (AG) which is located at an end of a network (E-UTRAN) and connected to an external network. The base stations can simultaneously transmit multiple data streams for a broadcast service, a multicast service and/or a unicast service.

One or more cells may exist for one base station. One cell is set to one of bandwidths of 1.25, 2.5, 5, 10, and 20 Mhz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to indicate time and frequency domains to which data will be transmitted and information related to encoding, data size, hybrid automatic repeat and request (HARQ). Also, the base station transmits uplink (UL) scheduling information of uplink data to the corresponding user equipment to indicate time and frequency domains that can be used by the corresponding user equipment, and information related to encoding, data size, HARQ. An interface for transmitting user traffic or control traffic can be used between the base stations. A Core Network (CN) may include the AG and a network node or the like for user registration of the UE. The AG manages mobility of a UE on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology is required for competitiveness in the future. In this respect, reduction of cost per bit, increase of available service, use of adaptable frequency band, simple structure, open type interface, proper power consumption of user equipment, etc. are required.

DISCLOSURE

Technical Problem

An object of the present invention is to provide a method and apparatus for transmitting and receiving signals between a base station and a relay node in a wireless communication system.

Technical Solution

The object of the present invention can be achieved by providing a method for transmitting signals from a base station a relay node in a wireless communication system, the method including resetting a start symbol index for a relay node dedicated physical downlink control channel (PDCCH) and a relay node dedicated physical downlink shared channel (PDSCH), respectively, transmitting a message including a parameter required for resetting the start symbol index to the relay node, setting the start symbol index to a value that has been given prior to receiving the reestablishment message, in the case where the relay node has sent a specific number of NACKs for the relay node dedicated downlink physical control channel or the relay node dedicated downlink physical common channel, and transmitting the relay node dedicated PDCCH and the relay node dedicated PDSCH to the relay node, on the basis of the start symbol index having been set.

Here, in case the start symbol index of the relay node dedicated PDCCH is fixed, the preset value as the start symbol index of the relay node dedicated PDSCH is set to be the same as the start symbol index of the relay node dedicated PDCCH. Further, the start symbol index is one of integers 0 to 13, and the preset value, which is set as the start symbol index of the fixed relay node dedicated PDCCH, is 4.

Further, the start symbol index of the relay node dedicated PDSCH may be set to 3.

Further, the preset value may be set to a start symbol index for performance of a random access process of the relay node.

In another aspect of the present invention, there is provided a method for receiving, by a relay node, a relay node dedicated physical downlink shared channel (PDSCH) from a base station in a wireless communication system, the method including receiving from the base station information related to a start symbol index of the relay node dedicated PDSCH, transmitting to the base station information related to a number of symbols used in a control region in an access downlink subframe between the relay node and a user equipment, resetting the start symbol index based on a reduced number of symbols in case a command to reduce the number of the symbols is received, and receiving the relay node dedicated PDSCH from the changed start symbol index.

Here, it is possible to receive a command to increase a start symbol index of the relay node dedicated PDSCH instead of a command to reduce the number of the symbols. In this case, a step of receiving the relay node dedicated PDSCH from the increased start symbol index may be further included. Preferably, a step of increasing the number of symbols used in the control region based on the command to increase the symbol index in the access downlink subframe may be further included.

Further, preferably, the information related to the start symbol index of the relay node dedicated PDSCH is received through a cell specific channel.

More preferably, the command to reduce the number of the symbols and the command to increase the start symbol index of the relay node dedicated PDSCH are received through a relay node specific channel.

Advantageous Effects

According to the present invention, a base station and a relay node can efficiently transmit and receive signals in a wireless communication system.

The effects of the present invention are not limited to the above-described effects and other effects which are not described herein will become apparent to those skilled in the art from the following description.

DESCRIPTION OF DRAWINGS

FIG. 2 illustrates the structure of a control plane and a user plane of a radio interface protocol between a user equipment and an E-UTRAN based on the 3GPP wireless access network standard.

BEST MODE

Figure 1:
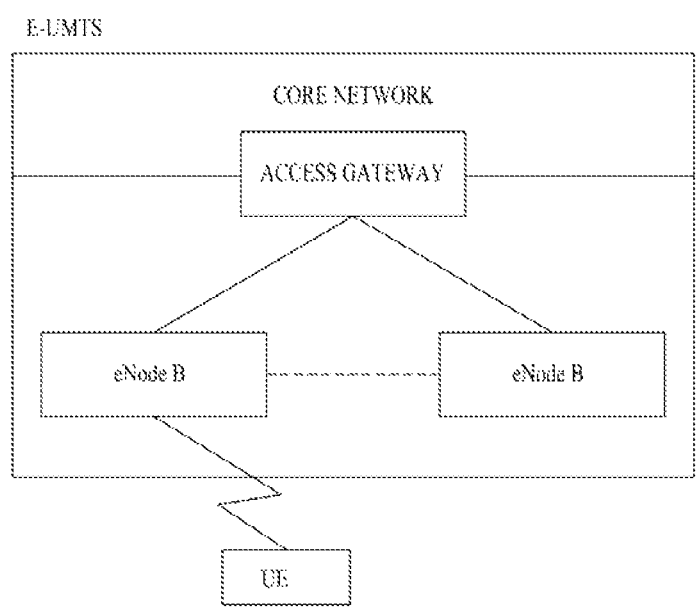
FIG. 1 schematically illustrates the structure of an E-UMTS network as an example of a wireless communication system.

Hereinafter, structures, operations, and other features of the present invention will be understood readily by the preferred embodiments of the present invention, examples of which are illustrated in the accompanying drawings. Embodiments described later are examples in which technical features of the present invention are applied to 3GPP system.

For convenience, although the embodiment of the present invention will be described based on the LTE system and the LTE-A system, the LTE system and the LTE-A system are only exemplary and can be applied to all communication systems corresponding to the aforementioned definition. Also, although the embodiment of the present invention will herein be described based on FDD mode, the FDD mode is only exemplary and the embodiment of the present invention can easily be applied to H-FDD mode or TDD mode.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used in the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control layer above the physical layer via a transport channel. Data are transferred between the medium access control layer and the physical layer via the transport channel. Data are transferred between one physical layer of a transmitting side and the other physical layer of a receiving side via the physical channel. The physical channel uses time and frequency as radio resources. Specifically, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control layer of the second layer provides a service to a radio link control (RLC) layer above the MAC layer via logical channels. The RLC layer of the second layer supports reliable data transfer. The RLC layer may be implemented as a functional block inside the MAC layer. In order to effectively transmit IP packets such as IPv4 or IPv6 within a radio interface having a narrow bandwidth, a packet data convergence protocol (PDCP) layer of the second layer performs header compression to reduce the size of unnecessary control information.

A radio resource control (hereinafter, abbreviated as 'RRC') layer located on the lowest part of the third layer is defined in the control plane only. The RRC layer is associated with configuration, re-configuration and release of radio bearers to be in charge of controlling the logical, transport and physical channels. In this case, the radio bearer means a service provided by the second layer for the data transfer between the user equipment and the network. To this end, the RRC layer of the user equipment and the network exchanges RRC message with each other. If the RRC layer of the user equipment is RRC connected with the RRC layer of the network, the user equipment is in RRC connected mode. If not so, the user equipment is in RRC idle mode. A non-access stratum (NAS) layer located above the RRC layer performs functions such as session management and mobility management.

One cell constituting a base station (eNB) is established at one of bandwidths of 1.25, 2.5, 5, 10, 15, and 20 Mhz and provides a downlink or uplink transmission service to several user equipments. At this time, different cells can be established to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
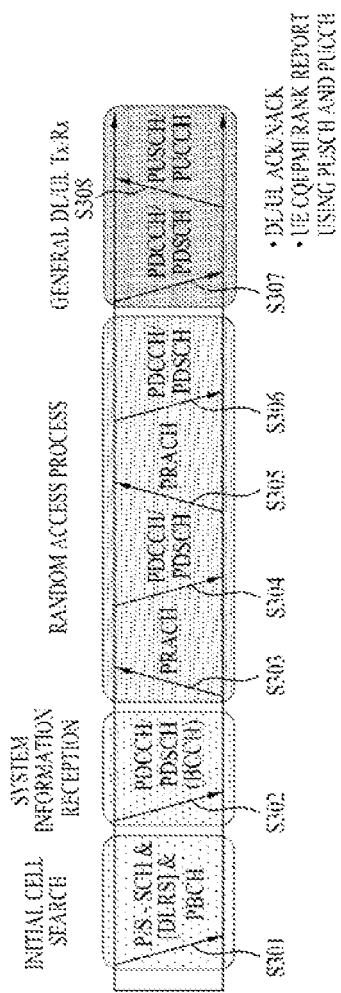
FIG. 3 illustrates physical channels used in a 3GPP system and a general method for transmitting signals using the physical channels.

FIG. 3 is a diagram illustrating physical channels used in a 3GPP system and a general method for transmitting a signal using the physical channels.

The user equipment performs initial cell search such as synchronizing with the base station when it newly enters a cell or the power is turned on (S301). To this end, the user equipment synchronizes with the base station by receiving a primary synchronization channel (P-SCH) and a secondary synchronization channel (S-SCH) from the base station, and acquires information of cell ID, etc. Afterwards, the user equipment can acquire broadcast information within the cell by receiving a physical broadcast channel from the base station. Meanwhile, the user equipment can identify the status of a downlink channel by receiving a downlink reference signal (DL RS) in the initial cell search step.

The user equipment which has finished the initial cell search can acquire more detailed system information by receiving a physical downlink shared channel (PDSCH) in accordance with a physical downlink control channel (PDCCH) and information carried in the PDCCH (S302).

Meanwhile, if the user equipment initially accesses the base station, or if there is no radio resource for signal transmission, the user equipment performs a random access procedure (RACH) for the base station (S303 to S306). To this end, the user equipment transmits a preamble of a specific sequence through a physical random access channel (PRACH) (S303 and S305), and receives a response message to the preamble through the PDCCH and the PDSCH corresponding to the PDCCH (S304 and S306). In case of a contention based RACH, a contention resolution procedure can be performed additionally.

The user equipment which has performed the aforementioned steps receives the PDCCH/PDSCH (S307) and transmits a physical uplink shared channel (PUSCH) and a physical uplink control channel (PUCCH) (S308), as a general procedure of transmitting uplink/downlink signals. In particular, the user equipment receives downlink control information (DCI) through the PDCCH. Here, the DCI includes control information such as resource allocation information, and the formats are different from each other according to the purpose of use.

Meanwhile, control information transmitted from the user equipment to the base station or received from the base station to the user equipment through the uplink includes downlink/uplink ACK/NACK signals, a channel quality indicator (CQI), a precoding matrix index (PMI), and a rank indicator (RI). In case of the 3GPP LTE system, the user equipment transmits the aforementioned control information such as CQI/PMI/RI through the PUSCH and/or the PUCCH.

Figure 4:
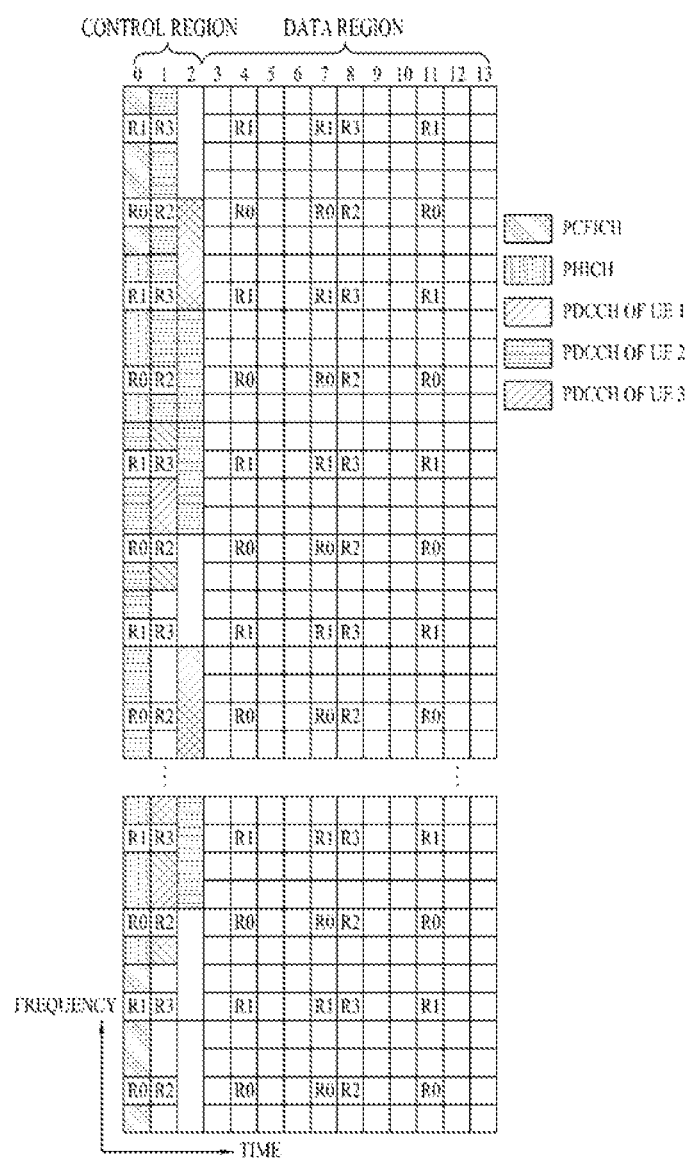
FIG. 4 illustrates the structure of a downlink radio frame used in an LTE system.

FIG. 4 illustrates a control channel included in a control region of one subframe in a downlink radio frame.

Referring to FIG. 4, a subframe comprises 14 OFDM symbols. First 1 to 3 OFDM symbols are used as a control region according to a subframe setting, and the remaining 13 to 11 OFDM symbols are used as a data region. In the drawings, R1 to R4 represent a reference signal (RS) or pilot signal for 0 to 3. The RS is fixed in a specific pattern within the subframe regardless of the control region and the data region. The control channel is allocated to a resource, to which the RS is not allocated, in the control region, and the traffic channel is also allocated to a resource, to which the RS is not allocated, in the data region. Some examples of the control channel, which is allocated to the control region, are a Physical Control Format Indicator CHannel (PCFICH), a Physical Hybrid-ARQ Indicator CHannel (PHICH), and a Physical Downlink Control CHannel (PDCCH).

The PCFICH as the physical control format indicator channel informs the user equipment of the number of OFDM symbols used in the PDCCH for each subframe. The PCFICH is located in the first OFDM symbol, and is established with the priority to the PHICH and PDCCH. The PCFICH comprises four resource element groups (REG), and each REG is distributed within the control region based on the cell ID. One REG comprises four resource elements (REs). Here, the RE refers to the minimum physical resource defined as one sub-carrier x one OFDM symbol. The PCFICH value indicates a value of 1 to 3 or 2 to 4 according to the bandwidth, and is modulated by Quadrature Phase Shift Keying (QPSK).

The PHICH as a physical HARQ indicator channel is used in carrying the HARQ ACK/NACK on the uplink transmission. That is, the PHICH represents a channel where DL ACK/NACK information for the UL HARQ is transmitted. The PHICH includes one REG, and is cell-specifically scrambled. The ACK/NACK is indicated as one bit, and is modulated by Binary phase shift keying (BPSK). The modulated ACK/NACK is spread by a spreading factor (2 or 4). A plurality of PHICHs mapped with the same resources constitutes the PHICH group. The number of PHICHs multiplexed in the PHICH is determined according to the number of spreading codes. The PHICH (group) is repeated three times to obtain a diversity gain in the frequency domain and/or time domain. Further, the PHICH or PHICH group is continued by as long as the number of symbols in one subframe, and this is called PHICH duration. The PHICH duration is signaled from the upper layer, and can be defined as shown in Table 1 below according to the subframe type.

TABLE 1

| PHICH duration | Normal subframes | MBSFN subframes |
| --- | --- | --- |
| Normal | 1 | 1 |
| Extended | 3 | 2 |

The PDCCH as the physical downlink control channel is allocated to first n OFDM symbols of the subframe. Here, n is an integer equal to or greater than 1, and is indicated by the PCFICH. The PDCCH comprises one or more CCEs. The PDCCH informs each user equipment and terminal group of information related with resource allocation of paging channel (PCH) and downlink-shared channel (SCH), an uplink scheduling grant and HARQ information, etc. The paging channel (PCH) and the downlink-shared channel (DL-SCH) are transmitted through the PDSCH. Hence, generally, the base station and the UE respectively transmit and receive data except specific control information or specific service data, through the PDSCH.

The information on to which UE (one or a plurality of UEs) the data of the PDSCH is transmitted and information on how the UEs receive and decode the PDSCH data, is included in the PDCCH, and is transmitted. For example, it is assumed that a specific PDCCH is CRC-masked as a radio network temporary identity (RNTI) called "A", and information on data transmitted using radio resources (e.g., frequency location) called "B" and transmission format information (e.g., a transmission block size, a modulation type, coding information, etc.) called "C", is transmitted through a specific subframe. In this case, a UE within a cell monitors the PDCCH using RNTI information held by the UE, and if there is one or more UEs having "A" RMTI, the UEs receive the PDCCH, and receive the PDSCH indicated by "B" and "C" through the information of the received PDCCH.

Further, in case the channel condition between a base station and a UE is poor, a relay node (RN) may be installed between the base station and the UE so that a radio channel with superior channel state is provided to the UE. Further, by introducing a relay node in a cell boundary area with inferior channel state from the base station and using the relay node, a high-speed data channel can be provided, and a cell service area can be extended. Likewise, the relay node is a technology which has been introduced to resolve the problem of an electric wave shading area, and is now widely used.

The previous method was limited to a repeater function which simply amplifies a signal and transmits the amplified signal, but the current method is being developed into a more intelligent form. Further, the relay node technology reduces the additional base station installation costs and the maintenance costs of the backhaul network, and is essential for service coverage extension and data processing rate improvement. As the relay node technology is improved, the relay node, which is used in the conventional radio communication system, needs to be supported in a new radio communication system.

In a 3rd Generation Partnership Project Long Term Evolution-Advanced (3GPP LTE-A) system, as a role of forwarding a link connection between a base station and a UE to a relay node, two types of links with different attributes are applied to each uplink and downlink carrier frequency band. The connection link, which is set between the base station and the relay node, is defined as the backhaul link. The transmission in the Frequency Division Duplex (FDD) or Time Division Duplex (TDD) method using the downlink resources is called the backhaul downlink, and the transmission in the FDD or TDD method using uplink resources is called the backhaul uplink.

Figure 5:
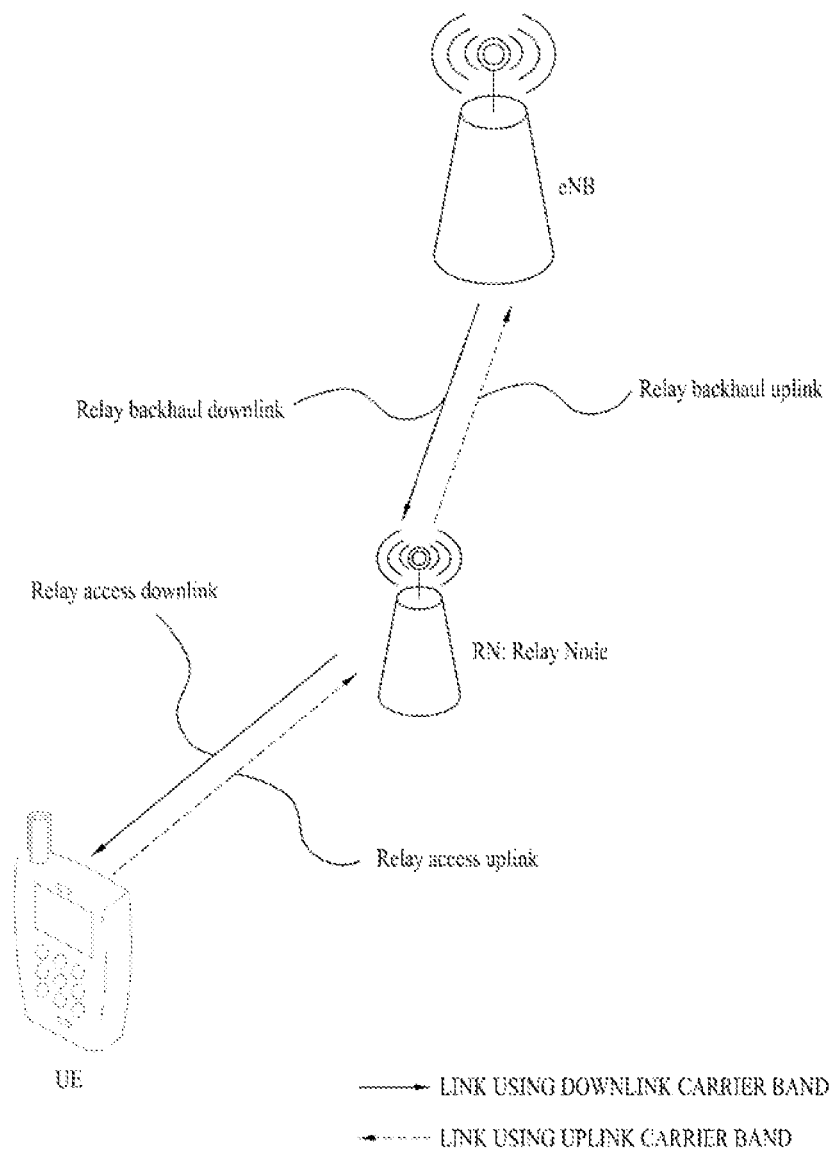
FIG. 5 illustrates the constitution of a relay backhaul link and a relay access link in a wireless communication system.

FIG. 5 illustrates the configuration of a relay backhaul link and a relay access link in a radio communication system.

Referring to FIG. 5, as a relay node is introduced for a role of forwarding link connection between a base station and a UE, two types of links with different attributes are applied to each uplink and downlink carrier frequency band. The connection link portion, which is set between the base station and the relay node, is defined and expressed as the relay backhaul link. In case the transmission of the backhaul link is performed using the downlink frequency band (the case of Frequency Division Duplex (FDD)) or downlink subframe (the case of Time Division Duplex (TDD)) resources, this case may be expressed as the backhaul downlink, and in case the transmission is performed using the uplink frequency band (the case of the FDD) or uplink subframe (the case of the TDD) resources, this case may be expressed as the backhaul uplink.

In contrast, the connection link portion, which is set between the relay node and a series of UEs, is called a relay access link. In case the transmission of the relay access link is performed using the downlink frequency band (the case of the FDD) or the downlink subframe (the case of the TDD) resources, this case is called an access downlink, and in case the transmission of the relay access link is performed using the uplink frequency band (the case of the FDD) or uplink subframe (the case of the TDD) resources, this case is called an access uplink.

A relay node may receive information from a base station via relay backhaul downlink or may transmit information to the base station via relay backhaul uplink. Further, the relay node may transmit information to a user equipment via relay access downlink or may receive information from the user equipment via relay access uplink.

With respect to the use of the band (or spectrum) of the relay node, the case, in which the backhaul link is operated in the same frequency band as that of the access link, is called "in-band", and the case, in which the backhaul link and the access link operate in different frequency bands, is called "out-band". A UE (hereinafter, referred to as "legacy user equipment"), which is operated according the existing LTE system, should be able to connect to a donor cell in both cases of the in-band and the out-band.

The relay node may be classified into a transparent relay node or a non-transparent relay node depending on whether the relay node is recognized in the UE. "Transparent" means the case in which the UE fails to recognize whether the UE communicates with the network through the relay node, and "non-transparent" means the case in which the UE recognizes whether the UE communicates with the network through the relay node.

With respect to the control of the relay nodes, the relay nodes may be divided into a relay node which is constituted as part of the donor cell, and a relay node that controls the cell by itself.

The relay node, which is constituted as part of the donor cell, may have a relay node identifier (ID), but does not have its own cell identity. If at least part of the radio resource management (RRM) is controlled by the base station which belongs to the donor cell (even if the remaining parts of the RRM are located in the relay node), the relay node is called a relay node which is constituted as part of a donor cell. Preferably, such a relay node may support a legacy user equipment. Some examples of such a relay node are a smart repeater, a decode-and-forward relay, an L2 (second layer) relay, and a type 2 relay node.

In the case of a relay node which controls a cell by itself, the relay node controls one or a multiple of cells, a unique physical layer cell identity is provided to each of the cells controlled by the relay node, and the same RRM mechanism may be used. From the perspective of the UE, there is no difference between access to the cell controlled by the relay node and access to the cell controlled by a general base station. Preferably, the cell, which is controlled by such a relay node, may support a legacy cell. For example, some examples such a relay node are a self-backhauling relay node, a L3(third layer) relay node, a type-1 relay node and a type-1a relay node.

The type-1 relay node as an in-band relay node controls a plurality of cells, and each of the plurality of cells is seen as a separate cell distinguished from the donor cell from the perspective of the UE. Further, the plurality of cells has their respective physical cell IDs (defined in LTE release-8), and the relay node may transmit its synchronization channel, reference signal, etc. In the case of single-cell operation, a UE may directly receive scheduling information and HARQ feedback from the relay node, and may transmit its control channel (scheduling request (SR), CQI, ACK/NACK, etc.) to the relay node. Further, the type-1 relay node is seen as a legacy base station (a base station operated according to the LTE release-8 system) to the legacy UEs (UEs operated according to the LTE release-8 system). That is, the relay node has backward compatibility. Further, the type-1 relay node is seen as a base station, which is different from the legacy base station, to the UEs operated according to the LTE-A system, thereby providing performance improvement.

The type-1a relay node is operated as out-band, and has the same characteristics as those of the above described type 1 relay node. The operation of the type-1a relay node may be configured in a manner that minimizes or removes the influence on the L1 (first layer) operation.

A type-2 relay node as an in-band relay node does not a separate physical cell ID, and thus does not form a new cell. The type-2 relay node is transparent to a legacy UE, and the legacy UE cannot recognize the existence of the type-2 relay node. The type-2 relay node may transmit a PDSCH, but at least does not transmit a CRS and PDCCH.

Further, in order to make a relay node to be operated as in-band, some resources in the time-frequency space should be prepared for the backhaul link, and these resources may be set not to be used for an access link. This is called resource partitioning.

A general principle of resource partitioning in a relay node is described as follows. The backhaul downlink and access downlink may be multiplexed in a time division multiplexing (TDM) method on one carrier frequency (i.e., only one of the backhaul downlink and the access downlink is activated at a specific time point). Similarly, the backhaul uplink and the access uplink may be multiplexed in a TDM method on one carrier frequency (i.e., only one of the backhaul uplink and the access uplink may be activated at a specific time point).

With respect to the backhaul link multiplexing in the FDD, the backhaul downlink transmission may be performed in the downlink frequency band, and the backhaul uplink transmission may be performed in the uplink frequency band. With respect to the backhaul link multiplexing in the TDD, the backhaul downlink transmission may be performed in the downlink subframe of the base station and the relay node, and the backhaul uplink transmission may be performed in the uplink subframe of the base station and the relay node.

In the case of an in-band relay node, for example, if a backhaul downlink reception from a base station and an access downlink transmission to a UE are performed at the same time in a preset frequency band, a signal transmitted from the transmission end of the relay node may be received in the reception end of the relay node, and thereby a signal interference or an RF jamming may occur in the RF front-end of the relay node. Similarly, if an access uplink reception from a UE and a backhaul uplink transmission are performed at the same time in a preset frequency band, signal interference may occur in the RF front-end of the relay node. Hence, simultaneous transmission and reception in one frequency band in a relay node may not be easily implemented unless a received signal is sufficiently separated from a transmitted signal (e.g., a transmission antenna and a reception antenna are installed in places which are physically located sufficiently away from each other (e.g., one the ground/under the ground).

One solution to solve such a signal interference problem is to prevent the relay node from transmitting a signal to a UE while receiving a signal from a donor cell. That is, the solution is to generate a gap in the transmission from the relay node to the UE, and to set the UE (including a legacy UE) so that UE does not expect any transmission from the relay node while there is such a gap. The gap may be set by constituting a multicast broadcast single frequency network (MBSFN) subframe.

Figure 6:
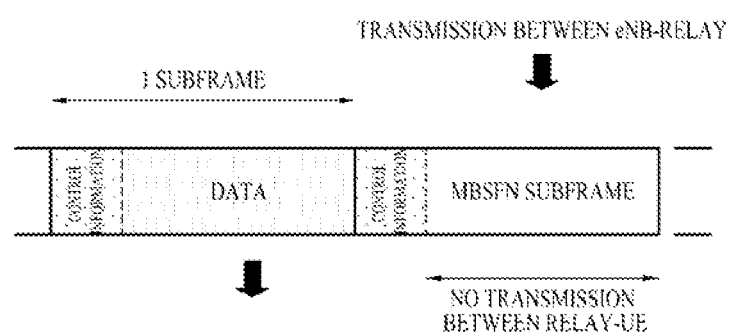
FIG. 6 illustrates an example of partitioning of relay node resources.

FIG. 6 illustrates partitioning of relay node resources.

Referring to FIG. 6, a first subframe is a general subframe, and in the first subframe, a downlink (i.e., access downlink) control signal and data are transmitted from the relay node to the UE. Further, a second subframe is an MBSFN subframe, and in the second subframe, a control signal is transmitted from the relay node to the UE in the control region of the downlink subframe, but not transmission is performed from the relay node to the UE in the remaining region of the subframe. Here, in the case of a legacy UE, transmission of a PDCCH is expected in all downlink subframes (in other words, the relay node needs to provide support so that legacy UEs within the area of the relay node receives a PDCCH in every subframe and performs a measuring function), and thus the PDCCH needs to be transmitted in all downlink subframes for appropriate operation of the legacy UE. Hence, even in a subframe (a second subframe), which is set for downlink (i.e., backhaul downlink) transmission from the base station to the relay node, the relay node needs to perform an access downlink transmission without receiving the backhaul downlink in first N (N=1, 2 or 3) OFDM symbol sections. Here, a PDCCH is transmitted from the relay node to the UE in the control region of the second subframe, and thus backward compatibility for a legacy UE, which serves in the relay node, may be provided. In the remaining region of the second subframe, the relay node may receive transmission from the base station while no transmission from the relay node to the UE is performed. Hence, through such resource partitioning, the access downlink transmission and backhaul downlink reception may be set not to be performed at the same time in the in-band relay node.

A second subframe, which uses a MBSFN subframe, will be specifically described below. A control region of the second subframe may be considered a non-hearing may be a relay node non-hearing section. The relay node non-hearing section means a section where the relay node transmits an access downlink signal without receiving a backhaul downlink signal. This section may be set to 1, 2 or 3 OFDM lengths. In the relay node non-hearing section, the relay node may perform a access downlink transmission to the UE, and in the remaining area, the relay node may receive the backhaul downlink from the base station. Here, since the relay node cannot simultaneously perform transmission and reception in the same frequency band, time is required for the mode of the relay node to be converted from the transmission mode to the reception mode. Therefore, it is necessary for a guard time (GT) to be set so that the relay node switches the transmission/reception modes in the initial some sections of the backhaul downlink reception area. Similarly, even in case the relay node receives a backhaul downlink from the base station, and is operated to transmit an access downlink to the UE, the guard time (GT) for switching the transmission/reception modes of the relay node may be set. Such guard time length may be given as a value of the time domain. For example, the length may be given as k (k≥1) time sample (Ts) values, or may be set to one or more OFDM symbol lengths. Further, the guard time of the last portion of the subframe may not be defined or set in case the relay node backhaul downlink subframe is continually set or according to a preset subframe timing alignment relation. In order to maintain the backward compatibility, such guard time may be defined only in the frequency domain which has been set for the backhaul downlink subframe transmission (in case the guard time has been set in the access downlink section, the legacy UE cannot be supported). In the backhaul downlink reception section except the guard time, the relay node may receive a PDCCH and a PDSCH from the base station. This may be expressed as a relay-PDCCH (R-PDCCH) or a relay-PDSCH (R-PDSCH) meaning a relay node dedicated physical channel.

The success of the decoding and demodulation of the channel is closely related with whether the relay node knows the exact location of the first symbol or the last symbol of the R-PDCCH and the R-PDSCH of the backhaul downlink. Further, the start and end of the backhaul subframe may be variable according to the number of symbols of the R-PDCCH, the number of symbols of the PDCCH, and the transmission and reception timing relation.

An available or receivable time section (here, a time section is expressed in symbol units) may be set as in the following four cases according to the timing relation between the base station and the relay node. First, it is assumed that the relay node may receive the downlink transmission from the symbol of index no. m to the symbol of index no. n (13 in the case of a general CP), one subframe starts from index no. 0, and the size of the control region used in the access downlink section is k OFDM symbols.

A first case is a case in which the relay node receives the backhaul subframe from (m=k+1)th index symbol to the last subframe (i.e., the 13th index symbol). This case corresponds to a case in which the switching time from the backhaul link reception to the access link transmission of the relay node is longer than the cyclic prefix (CP) length.

A second case is a case in which the relay node receives the backhaul subframe from the (m=k)th index symbol to the last subframe (i.e., the 13th index symbol). This case corresponds to a case in which the access link transmission timing of the relay node is matched with the backhaul link reception timing.

A third case is a case in which the relay node receives the backhaul subframe from the m(≥k)th index symbol to the n(<13)th index symbol, and m and n are determined based on the propagation delay and the switching time. This case corresponds to a case in which the access link transmission timing of the relay node is synchronized with the downlink transmission timing of the base station.

A fourth and last case is a case in which the relay node receives the backhaul subframe from 0th index symbol to n(n=13−(k+1))th index symbol. This case corresponds to a case in which the relay node receives a general PDCCH, not an R-PDCCH, from the base station.

In the cases mentioned above, the start symbol, which transmits the actual R-PDCCH and R-PDSCH, may be signaled in the following method.

First, the start symbol location (s1) of the R-PDCCH may be fixed to symbol index 3, and the start symbol location (s2) of the R-PDSCH in the PRB without including the R-PDCCH may be individually signaled. Here, s2 is m≤s2≤3, and s2 may be dynamically signaled using the R-PDCCH or be indicated through the upper layer signaling as in the RRC signaling. In particular, in the case of the RRC signaling, it is desirable that the location is informed to the relay node through the RRC signaling only in case the location of the R-PDSCH start symbol is intended to be changed. Here, the RRC signaling may be a relay node specific signaling or may be a cell specific signaling as in broadcast information.

Further, both the R-PDCCH start symbol location (s1) and the R-PDSCH start symbol location (s2) may be indicated through the upper layer signaling. Here, preferably, s1 and s2 have the same value, and s1 and s2 are m≤s1=s2≤sx (here, sx is an integer between 3 and 5).

First Embodiment

The above described methods have no problem in case the resetting procedure of an UE, which appropriately changes the above parameters through the upper layer signaling, is performed. However, unlike the resetting procedure of the UE, if the base station unilaterally broadcasts a changed parameter and a response message thereabout is not defined, the resetting procedure needs to be newly defined. The first embodiment of the present invention defines the operation of the relay node in a situation where a response message to the resetting message of the base station is not defined.

First, when the relay node fails to receive the resetting message, which is broadcast from the base station, a preset parameter is used. For example, in case the R-PDCCH start symbol (s1) is determined, if the reception of the resetting message is failed, s2 follows s1. In this case, if the base station also determines that the relay node has failed to appropriately receive the resetting message, the value is returned to a preset value. Here, repeated NACK/DTXs, preset timer, etc. may be utilized as a basis for the base station to determine that the relay node has failed to appropriately receive the resetting message.

Further, if the base station determines that the relay node has failed to appropriately receive the resetting message, the base station may transmit the R-PDCCH and the R-PDSCH by returning to a previously-set value. Likewise, in case the relay node also fails to continually demodulate the R-PDSCH or a preset timer expires, the previously-set value is maintained. In this way, the base station and the relay node may maintain transmission and reception based on the same parameter.

Finally, if the relay node fails to receive the resetting message, which is broadcast from the base station, the most recent parameters in the case, in which the relay node is operated at UE mode, may be used. Here, the UE mode means the RACH procedure for the relay node to connect to the base station, etc. In particular, preferably, the returning to the most recent parameter in the case, in which the relay node is operated at the UE mode, is performed after an attempt to return to the preset parameter or the previously-set value.

Second Embodiment

The second embodiment of the present invention relates to a method of determining an R-PDCH reception timing (s2) based on the number of symbols (k) of the PDCCH of the access link in the relay node. Likewise, it is assumed that the start symbol location (s1) of the R-PDCCH is fixed at symbol index 3.

1) First, all relay nodes controlled by the base station may transmit k value to the base station, the base station may analyze all k values received from each relay node, and s2 value is determined for each relay node and is individually signaled. In this case, the base station signals the most appropriate s2 value for each relay node, and thus the R-PDSCH start symbol may be different for each relay node.

2) However, in case the number of relay nodes is large, the overhead may become large. Hence, basically s2 value is signaled through cell specific signaling, but relay node specific signaling only to a specific number of relay nodes may be used.

Figure 7:
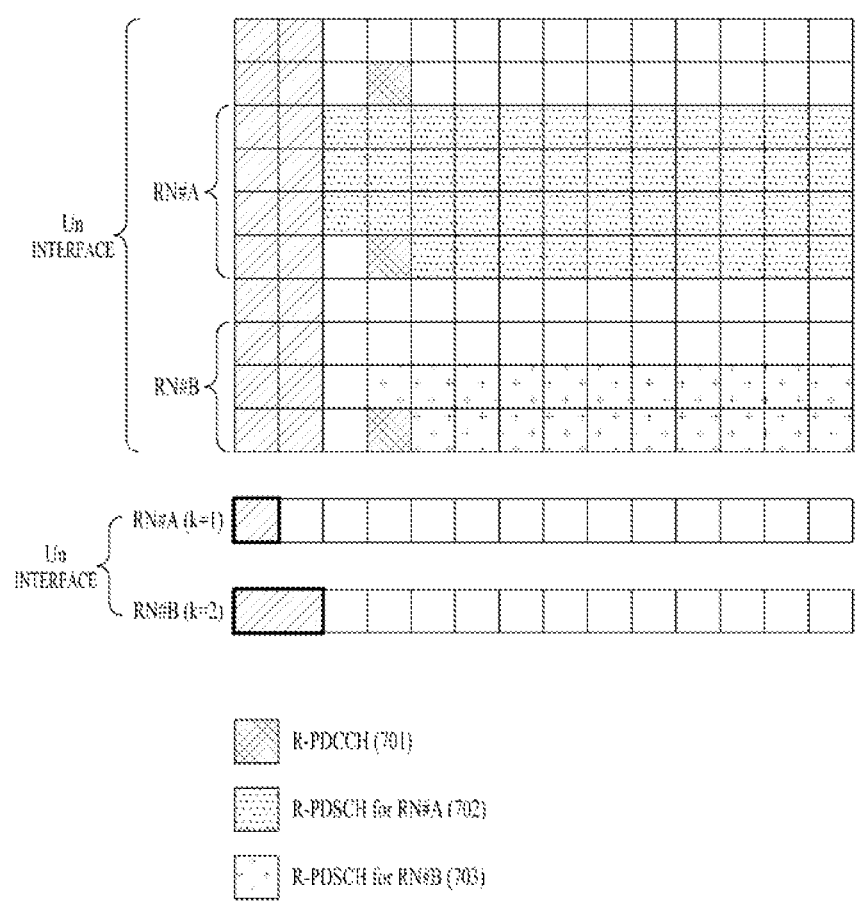
FIG. 7 is a view illustrating a second exemplary embodiment of the present invention.

FIG. 7 illustrates a second embodiment of the present invention.

Referring to FIG. 7, the base station controls two kinds of relay nodes, which are RN#A and RN#B, and the start symbol index s1 of the R-PDSCH 701 is 3. In this case, as in FIG. 7, if the k value of the RN#A is 1 and the k value of the RN#B is 2, the R-PDSCH 702 of the RN#A is transmitted from the symbol of index 2 (i.e., the third symbol), and the R-PDSCH 703 of the RN#B is transmitted from the symbol of index 3 (i.e., the fourth symbol).

First, a case, in which there are many relay nodes corresponding to the RN#A, will be described below. That is, it is assumed that the R-PDSCHs of only a few relay nodes are started in the fourth symbol, and the R-PDSCHs of a large majority of relay nodes are started in the third symbol.

Figure 8:
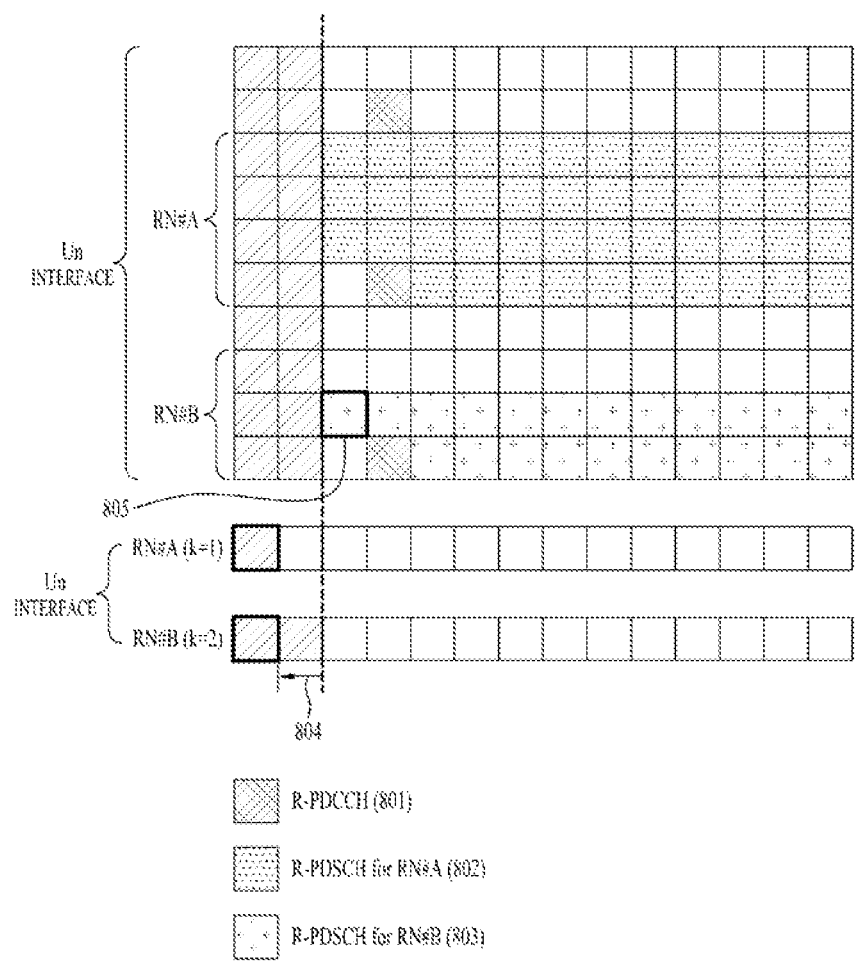
FIG. 8 is another view illustrating a second exemplary embodiment of the present invention.

FIG. 8 is another view illustrating a second embodiment of the present invention.

Referring to FIG. 8, the base station gives relay nodes (wherein k=2) a command to change k to 1, the base station transmits PDCCHs through 2 symbols, and then promptly transmits the R-PDSCH from the third symbol. Such a command may be implemented by directly signaling s2 value to the relay node with a relay node specific signal. That is, it is notified that the same s2 value may be transmitted to all relay nodes, the k of some relay nodes wherein k=2 may be changed to 1, and the R-PDSCH may be transmitted from the third symbol.

The situation may be divided into when following this command and when conditionally following this command and the relay node may perform the following procedure.

First, in case the relay node follows a command to change the k to 1, the k may be maintained at 1 in both fake-MBSFN subframes and general subframes by following the eNB command. Particularly, the PHICH, which is the basis of the k value, is designated by the upper layer signaling, and thus it is assumed that the PHICH cannot be dynamically changed. Hence, the relay node recognizes that the R-PDSCH may be transmitted from the third symbol, and the control region is set to occupy 1 symbol in the access link, too (i.e., general PHICH duration is used).

Next, the case when conditionally following the command to change k to 1, will be described below. If a general subframe is using extended PHICH duration, k=2 should be maintained even in an adjacent fake-MBSFN subframe, and thus the relay node does not follow the command to change the k value to 1. In this case, the relay node, which has not followed the command, cannot receive the R-PDSCH of the third symbol. The relay node performs demodulation assuming that the R-PDSCH of the third symbol has been punctured. Here, there is a danger that, in case the R-PDSCH has been transmitted the frequency first mapping scheme, the loss of systematic bits is caused. In this case, if the frequency first mapping scheme is applied to the start symbol of the R-PDSCH with respect to the R-PDCCH symbol location when mapping the R-PDSCH, the base station may solve the above described danger. However, the distinction between general PHICH duration and extended PHICH duration is directly related with the number of UEs controlled by the relay node. In a situation where the number of UEs controlled by the relay node is on the decrease, if the relay node uses general PHICH duration even in the general subframe, it is no problem that k=1 is used in the adjacent fake-MBSFN subframe, and thus the relay node follows the command to change the k value to 1.

First, a case, in which there are many relay nodes corresponding to the RN#B, will be described below. That is, it is assumed that the R-PDSCHs of only a few relay nodes are started from the third symbol, and the R-PDSCHs of the majority of relay nodes are started in the fourth symbol.

Figure 9:
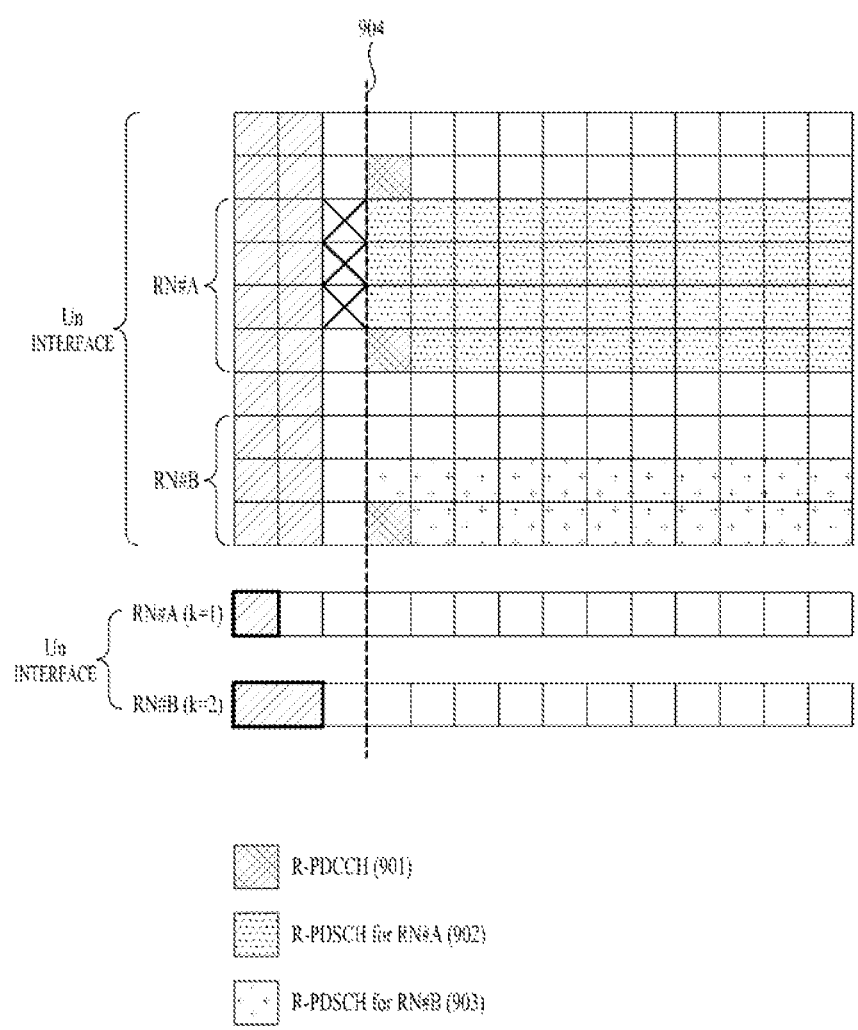
FIG. 9 is further another view illustrating a second exemplary embodiment of the present invention.

FIG. 9 is further another view illustrating a second embodiment.

Referring to FIG. 9, in the case of the RN#A with k(=1), the R-PDSCH may be received from the third symbol. That is, since the R-PDSCH exists in the third symbol only in the RM allocated to only a few RN#As and thereby problems such as inter-symbol power fluctuation, etc. may be caused, s2 value is forcibly changed so that the RN#A is received from the fourth symbol as in reference numeral 904 like the RN#B with k(=2), and a command is given through relay node specific signaling. Likewise, by dividing the situation into when following this command and when not following this command, the relay node may perform the following procedure.

First, when following the command, the relay node extends the control region of the Uu interface to 2 symbols, and uses extended PHICH duration. Hence, the extended PHICH, i.e., the third symbol, should be used even in the general subframe.

Next, when not following this command, the relay node receives the R-PDSCH in the second, third and fourth symbols in the control region of the Uu interface while remaining the RN PDCCH in the first symbol. In this case, the number of symbols used in the control region in the general subframe should be 1.

3) Finally, in consideration of all k values received by the base station from the relay node, the transmission of the R-PDSCH may be set to be started based on the largest k value. In this case, relay node specific signaling is unnecessary, and may be set to broadcast information and common signaling.

Third Embodiment

A third embodiment of the present invention relates to a method of securing the resource area for notifying all relay nodes of specific information. The resource area may be expressed as a specific RB of a specific subframe.

Figure 10:
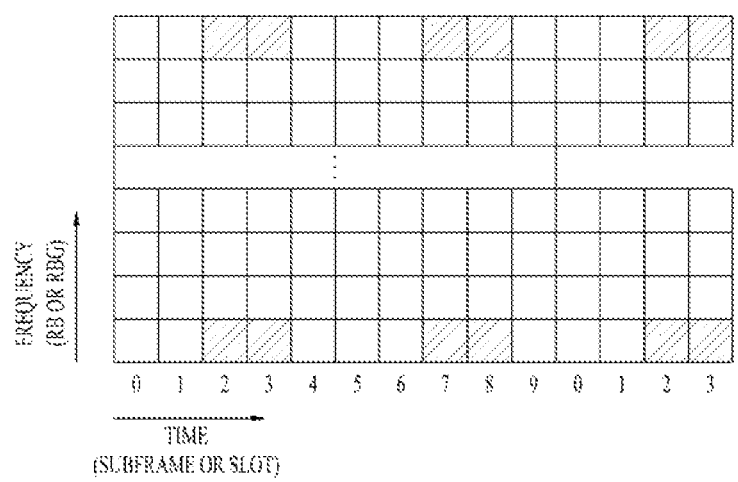
FIG. 10 illustrates a common resources area for informing all relay nodes of specific information according to a third exemplary embodiment of the present invention.

FIG. 10 illustrates a common resource area for notifying all relay nodes of specific information according to the third embodiment of the present invention.

Referring to FIG. 10, illustrates a method of reserving a specific RB of subframe #2, #3, #7 and #8 as a common resource area for notifying relay nodes of specific information. In particular, such a common resource area may be used even in a special case in which the base station should transmit only the uplink grants to the relay node. That is, by collecting individual uplink grants and transmitting the uplink grants through the common resource area, the relay nodes may detect uplink grants by blind-decoding only the area.

Figure 11:
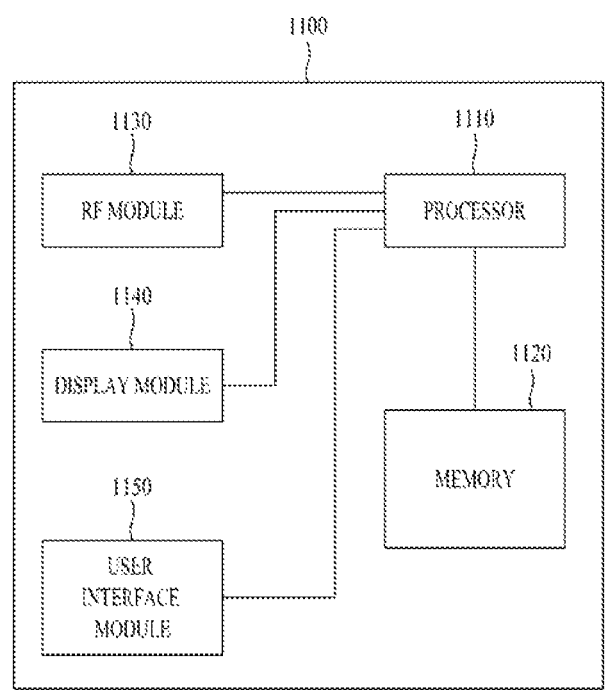
FIG. 11 is a block diagram of a communication unit according to an exemplary embodiment of the present invention.

FIG. 11 is a block diagram illustrating a communication apparatus according to an embodiment of the present invention.

Referring to FIG. 11, a communication apparatus 1100 includes a processor 1110, a memory 1120, an RF module 1130, a display module 1140 and a user interface module 1150.

The communication apparatus has been illustrated for the convenience of explanation, and some modules may be omitted. Further, the communication apparatus may further include necessary modules. Further, in the communication apparatus 1100, some modules may be divided into more specific modules. The processor 1110 is configured to perform an operation according to an embodiment of the present invention illustrated with reference to the drawings. Specifically, FIGS. 1 to 10 may be referred to for the specific operation of the processor 1110.

The memory is connected to the processor 1110, and stores an operating system, an application, a program code, data, etc. The RF module 1130 is connected to the processor 1110, converts a baseband signal into a radio signal or coverts a radio signal into a baseband signal. To this end, the RF module 1130 performs analog conversion, amplification, filtering, frequency up-conversion and a reverse process thereof. The display module 1140 is connected to the processor 1110, and displays various sets of information. The display module 1140 may use well-known elements such as a liquid crystal display (LCD), a light emitting diode (LED) and an organic light emitting diode (OLED), but not limited thereto. The user interface module 1150 is connected with the processor 1110, and may be configured by a combination of well-known user interfaces such as a keypad, a touch screen, etc.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between a base station and a user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point.

The embodiments according to the present invention may be implemented by various means, for example, hardware, firmware, software, or their combination. If the embodiment according to the present invention is implemented by hardware, the random access method in the wireless communication system according to the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of processing data in a wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention has been described centering on an example applied to a 3GPP LTE system, but is also applicable to systems various types of multiple antennas and radio communication systems in addition to the 3GPP LTE system.

The invention claimed is:

1. A method for transmitting signals to a relay node by a base station in a wireless communication system, the method comprising:
   resetting a start symbol index for a relay node dedicated physical downlink control channel (PDCCH) and a relay node dedicated physical downlink shared channel (PDSCH), respectively;
   transmitting a message including a parameter required for resetting the start symbol index to the relay node;
   setting the start symbol index to a value that has been given prior to transmitting the message or has been predetermined, in the case of receiving, from the relay node, a specific number of NACKs for the relay node dedicated downlink physical control channel or the relay node dedicated downlink physical common channel; and
   transmitting the relay node dedicated PDCCH and the relay node dedicated PDSCH to the relay node, on the basis of the start symbol index having been set.

2. The method according to claim 1, wherein, in case the start symbol index of the relay node dedicated PDCCH is fixed, the preset value as the start symbol index of the relay node dedicated PDSCH is the same as the start symbol index of the relay node dedicated PDCCH.

3. The method according to claim 2, wherein the start symbol index is one of integers 0 to 13, and the preset value set as the start symbol index of the fixed relay node dedicated PDCCH is 4.

4. The method according to claim 1, wherein the start symbol index is one of integers 0 to 13, and the start symbol index of the relay node dedicated PDSCH is 3.

5. The method according to claim 1, wherein the preset value is a start symbol index for performance of a random access process of the relay node.

6. A method for receiving a relay node dedicated physical downlink shared channel (PDSCH) from a base station by a relay node in a wireless communication system, the method comprising:
   receiving an information related to a start symbol index of the relay node dedicated PDSCH from the base station;
   transmitting an information related to a number of symbols used in a control region in an access downlink subframe between the relay node and a user equipment to the base station;
   resetting the start symbol index based on a reduced number of symbols in case a command to reduce the number of the symbols is received; and
   receiving the relay node dedicated PDSCH from the changed start symbol index.

7. The method according to claim 6, wherein information related to the start symbol index of the relay node dedicated PDSCH is received through a cell specific channel.

8. The method according to claim 6, wherein the command to reduce the number of the symbols is received through a relay node specific channel.

9. A method for receiving, by a relay node, a relay node dedicated physical downlink shared channel (PDSCH) from a base station in a wireless communication system, the method comprising:
- receiving information related to a start symbol index of the relay node dedicated PDSCH from the base station;
- transmitting information related to a number of symbols used in a control region in an access downlink subframe between the relay node and a user equipment to the base station;
- receiving a command to increase a start symbol index of the relay node dedicated PDSCH; and
- receiving the relay node dedicated PDSCH from the increased start symbol index.

10. The method according to claim 9, further comprising:
- increasing the number of symbols used in the control region based on the command to increase the symbol index in the access downlink subframe.

11. The method according to claim 9, wherein the information related to the start symbol index of the relay node dedicated PDSCH is received through a cell specific channel.

12. The method according to claim 9, wherein the command to increase the start symbol index of the relay node dedicated PDSCH is received through a relay node specific channel.

* * * * *